United States Patent
Takagi et al.

(10) Patent No.: US 8,028,202 B2
(45) Date of Patent: Sep. 27, 2011

(54) DATA MANAGEMENT DEVICE AND DATA MANAGING METHOD FOR THE REPLICATION OF DATA

(75) Inventors: Shunsuke Takagi, Kawasaki (JP); Tetsutaro Maruyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/749,736

(22) Filed: Mar. 30, 2010

(65) Prior Publication Data

US 2010/0251011 A1  Sep. 30, 2010

(30) Foreign Application Priority Data

Mar. 31, 2009  (JP) ................................. 2009-087636

(51) Int. Cl.
*G06F 11/00* (2006.01)

(52) U.S. Cl. ...................... 714/47.2; 714/6.12; 714/6.22

(58) Field of Classification Search ................. 714/6, 7, 714/6.12, 6.22, 47.2
See application file for complete search history.

(56) References Cited

U.S. PATENT DOCUMENTS

| | | |
|---|---|---|
| 5,699,403 A | 12/1997 | Ronnen |
| 5,727,144 A | 3/1998 | Brady et al. |
| 6,079,029 A | 6/2000 | Iwatani |
| 6,598,174 B1 | 7/2003 | Parks et al. |
| 7,028,216 B2 * | 4/2006 | Aizawa et al. ..................... 714/7 |
| 7,574,623 B1 | 8/2009 | Goel et al. |
| 7,685,463 B1 * | 3/2010 | Linnell ............................. 714/7 |
| 2004/0260967 A1 | 12/2004 | Guha et al. |
| 2005/0086557 A1 | 4/2005 | Sato et al. |
| 2005/0114728 A1* | 5/2005 | Aizawa et al. ..................... 714/6 |
| 2005/0210161 A1* | 9/2005 | Guignard et al. .............. 710/15 |
| 2005/0262385 A1 | 11/2005 | McNeill, Jr. et al. |
| 2007/0220376 A1* | 9/2007 | Furukawa ........................ 714/57 |
| 2008/0126720 A1 | 5/2008 | Danilak |
| 2009/0204852 A1* | 8/2009 | Diggs et al. ..................... 714/42 |

FOREIGN PATENT DOCUMENTS

| | | |
|---|---|---|
| JP | 8-307524 A | 11/1996 |
| JP | 10-260789 A | 9/1998 |
| JP | 2005-4681 A | 1/2005 |

OTHER PUBLICATIONS

United Kingdom Search Report dated May 20, 2010 for corresponding United Kingdom Application No. GB1001182.3.

* cited by examiner

*Primary Examiner* — Robert Beausoliel, Jr.
*Assistant Examiner* — Elmira Mehrmanesh
(74) *Attorney, Agent, or Firm* — Fujitsu Patent Center

(57) ABSTRACT

A data management device accessible to a plurality of memories includes a risk unit which determines risk of failure associated with each of the plurality of memories, a selection unit which selects a memory from among the plurality of memories on the basis of the determined risk and a transmitting unit which transmits a replication instruction to another memory of the plurality of memories. The replication instruction causes replication of the data to be replicated that is stored in the selected memory.

15 Claims, 20 Drawing Sheets

FIG. 4

SCORE TABLE (400)

| WARNING OBJECT | ERROR NAME | SCORE |
|---|---|---|
| DISK NODE | correctable memory error | 1 |
| DISK NODE | MIB not found | 2 |
| ⋮ | ⋮ | ⋮ |
| RAID DEVICE | bad block detected | 1 |
| RAID DEVICE | Disk Fail | 2 |
| ⋮ | ⋮ | ⋮ |

FIG. 5

WARNING LOG TABLE (500)

| DISK NODE ID | DATE | ERROR MANE |
|---|---|---|
| 006 | 12/3/2008 | correctable memory error |
| 006 | 12/5/2008 | Disk Fail |
| 006 | 12/6/2008 | bad block detected |
| 006 | 12/6/2008 | MIB not found |
| ⋮ | ⋮ | ⋮ |

FIG. 6

RISK POINT RANKING TABLE (600)

| RANKING | DISK NODE ID | RISK POINT |
|---|---|---|
| 1 | 006 | 9 |
| 2 | 004 | 6 |
| 3 | 003 | 5 |
| 4 | 001 | 3 |
| 5 | 005 | 1 |
| 6 | 002 | 0 |

FIG. 16

MANAGEMENT TABLE 1600

| DISK NODE ID | SLICE NAME | DATA CLASS | DISK NODE ID OF DISK NODE HOLDING DATA PAIRED WITH SLICE | DISK NODE ID OF DISK NODE HOLDING REPLICATED SPARE DATA |
|---|---|---|---|---|
| 001 | A | 1 | 006 | 005 |
| 001 | B | 2 | 002 | 000 |
| 002 | B | 1 | 001 | 000 |
| 002 | C | 2 | 003 | 000 |
| 003 | C | 1 | 002 | 000 |
| 003 | D | 2 | 004 | 000 |
| 003 | H | 1 | 000 | 000 |
| 004 | D | 1 | 003 | 000 |
| 004 | E | 2 | 005 | 000 |
| 004 | G | 1 | 000 | 000 |
| 005 | E | 1 | 004 | 000 |
| 005 | F | 2 | 006 | 001 |
| 005 | A | 3 | 000 | 000 |
| 006 | F | 1 | 005 | 000 |
| 006 | A | 2 | 001 | 005 |

FIG. 17

MANAGEMENT TABLE 1600

| DISK NODE ID | SLICE NAME | DATA CLASS | DISK NODE ID OF DISK NODE HOLDING DATA PAIRED WITH SLICE | DISK NODE ID OF DISK NODE HOLDING REPLICATED SPARE DATA |
|---|---|---|---|---|
| 001 | A | 1 | 005 | 000 | ← R1
| 001 | B | 2 | 002 | 000 |
| 001 | F | 3 | 000 | 000 |
| 002 | B | 1 | 001 | 000 |
| 002 | C | 2 | 003 | 000 |
| 002 | F | 2 | 005 | 001 | ← R2
| 003 | C | 1 | 002 | 000 |
| 003 | D | 2 | 004 | 000 |
| 003 | H | 1 | 000 | 000 |
| 004 | D | 1 | 003 | 000 |
| 004 | E | 2 | 005 | 000 |
| 004 | G | 1 | 000 | 000 |
| 005 | E | 1 | 004 | 000 |
| 005 | F | 1 | 002 | 001 | ← R3
| 005 | A | 2 | 001 | 000 | ← R4
| 006 | F | 1 | 005 | 000 | ← R5
| 006 | A | 2 | 001 | 005 | ← R6

| DISK NODE ID:001 | | |
|---|---|---|
| SLICE NAME | DATA CLASS | ADDRESS INFORMATION |
| A | 1 | … |
| B | 2 | … |

(B)

| DISK NODE ID:002 | | |
|---|---|---|
| SLICE NAME | DATA CLASS | ADDRESS INFORMATION |
| B | 1 | … |
| C | 2 | … |

(C)

| DISK NODE ID:003 | | |
|---|---|---|
| SLICE NAME | DATA CLASS | ADDRESS INFORMATION |
| C | 1 | … |
| D | 2 | … |
| H | 1 | … |

(D)

| DISK NODE ID:004 | | |
|---|---|---|
| SLICE NAME | DATA CLASS | ADDRESS INFORMATION |
| D | 1 | … |
| E | 2 | … |
| G | 1 | … |

(E)

| DISK NODE ID:005 | | |
|---|---|---|
| SLICE NAME | DATA CLASS | ADDRESS INFORMATION |
| E | 1 | … |
| F | 2 | … |
| A | 3 | … |

(F)

| DISK NODE ID:006 | | |
|---|---|---|
| SLICE NAME | DATA CLASS | ADDRESS INFORMATION |
| F | 1 | … |
| A | 2 | … |

FIG. 19

(A)
| DISK NODE ID:001 |||
| SLICE NAME | DATA CLASS | ADDRESS INFORMATION |
| --- | --- | --- |
| A | 1 | ... |
| B | 2 | ... |

(B)
| DISK NODE ID:002 |||
| SLICE NAME | DATA CLASS | ADDRESS INFORMATION |
| --- | --- | --- |
| B | 1 | ... |
| C | 2 | ... |
| F | 2 | ... |

(C)
| DISK NODE ID:003 |||
| SLICE NAME | DATA CLASS | ADDRESS INFORMATION |
| --- | --- | --- |
| C | 1 | ... |
| D | 2 | ... |
| H | 1 | ... |

(D)
| DISK NODE ID:004 |||
| SLICE NAME | DATA CLASS | ADDRESS INFORMATION |
| --- | --- | --- |
| D | 1 | ... |
| E | 2 | ... |
| G | 1 | ... |

(E)
| DISK NODE ID:005 |||
| SLICE NAME | DATA CLASS | ADDRESS INFORMATION |
| --- | --- | --- |
| E | 1 | ... |
| F | 1 | ... |
| A | 2 | ... |

(F)
| DISK NODE ID:006 |||
| SLICE NAME | DATA CLASS | ADDRESS INFORMATION |
| --- | --- | --- |
| F | 1 | ... |
| A | 2 | ... |

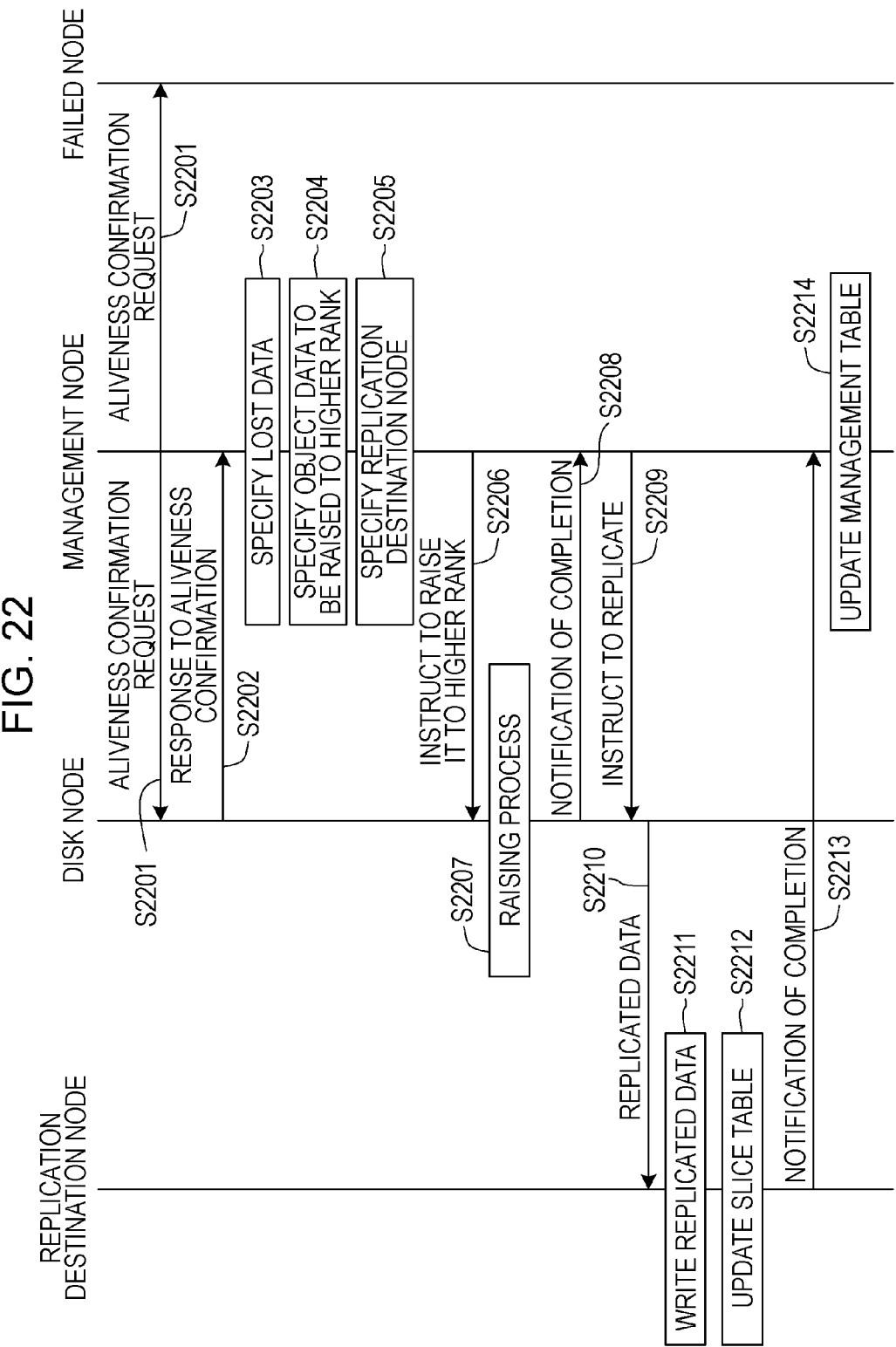

DATA MANAGEMENT DEVICE AND DATA MANAGING METHOD FOR THE REPLICATION OF DATA

CROSS-REFERENCE TO RELATED APPLICATIONS

This application is based upon and claims the benefit of priority of the prior Japanese Patent Application No. 2009-87636, filed on Mar. 31, 2009, the entire contents of which are incorporated herein by reference.

FIELD

The embodiment(s) discussed herein is (are) related to a data management device for managing data and a data managing method.

BACKGROUND

A conventional system and a method of assessing and identifying a failed state of components of a communication network have been disclosed (for example, Japanese Laid-open Patent Publication No. 8-307524). The conventional technique disclosed therein is as follows. That is, a data acquiring/processing module operates to acquire and process a warning message signal transmitted over a communication network and to generate an abnormal condition signal. Next, the module operates to generate a direct risk signal and an indirect risk signal on the basis of the generated abnormal condition signal, an external condition signal and registered reference data. Then, the module operates to combine the direct risk signal with the indirect risk signal as support to assess a risk involving a component which is in an abnormal condition and to display a risk signal of the component. The module also operates to calculate and display a risk signal of a sub-network on the basis of disconnection influence data and failure influence data involving the sub-network of the communication network. The module further operates to adjust risk calculations in which various types of maintenance activities are considered in order that the communication network may determine how it responds in accordance with these maintenance activities.

In addition, a conventional technique of fetching a device alternative to a failed device (hereinafter, referred to as a failure alternate device) from another high-redundancy logic group to recover redundancy with no need of hot spare patrol is also disclosed (for example, Japanese Laid-open Patent Publication No. 10-260789). In this conventional technique, in case of RAID-1 of a mirror device correspondence type, a configuration control section constructs a first logic group in which the same data is stored in N (=2) devices to duplicate the data and a second logic group in which the same data is stored in N+1 (=3) devices to triplicate the data as the logic groups of a device array unit. A failure processing section fetches one of the devices in the high-redundancy second logic group into the first logic group in the case that one device in the low-redundancy first logic group has failed and its redundancy is lost, to reconstitute data as the failure alternate device, thereby recovering the redundancy of the first logic group. Further, a conventional technique of duplicating data in a logical volume to perform logical volume allocation without fixing the role of a physical module is disclosed (for example, Japanese Laid-open Patent Publication No. 2005-004681). In this conventional technique, an integrated management module selects a module having a storage device of a designated range as an object to which slice data is to be allocated on the basis of a request from a client, allocates primary logical volumes to modules having slice areas to which no volume is allocated in the one-to-one correspondence by the number necessary in a round robin system and allocates secondary logical volumes to modules which have been selected in accordance with a predetermined assessment function by the number necessary in the system under a constraint condition that the secondary logical volume is not allocated to the module having the primary logical volume and handling the same data area as a module to which the secondary logical volume is allocated.

SUMMARY

According to an aspect of the invention, a data management device accessible to a plurality of memories includes a risk unit which determines a risk of failure associated with each memory of the plurality of memories, a selection unit which selects a memory of the plurality of memories based on the determined risk of failure associated with each memory of the plurality of memories, the selected memory storing data to be replicated, the data to be replicated being one of master data and replicated data corresponding to the master data, and a transmitting unit which transmits a replication instruction to another memory of the plurality of memories, the replication instruction causes replication of the data to be replicated in the selected memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating a score table;

FIG. 5 is a diagram illustrating a warning log table;

FIG. 6 is a diagram illustrating a risk point ranking table;

FIG. 16 is a diagram illustrating an example of a management table;

FIG. 17 is a diagram illustrating an example of a management table obtained after updated;

FIG. 18 is a diagram illustrating an example of a slice table;

FIG. 19 is a diagram illustrating an example of a slice table obtained after updated;

FIG. 22 is a sequence diagram illustrating a data rank-raising process.

DESCRIPTION OF EMBODIMENTS

As an existing system, a system of the type of reducing the risk of data loss by duplicating data and holding the duplicated data in two nodes is well known. However, in this system, it may be indispensable to perform a recovering operation every time a node has failed. As the data held in each node is increased, the time required for execution of the recovering operation is increased and a failure of another node occurring while the recovering operation is being performed induces a double fault and hence data loss may occur.

Next, embodiments of a data management device and a data managing method will be described in detail with reference to the accompanying drawings.

System Configuration of Memory System

Figure 1:
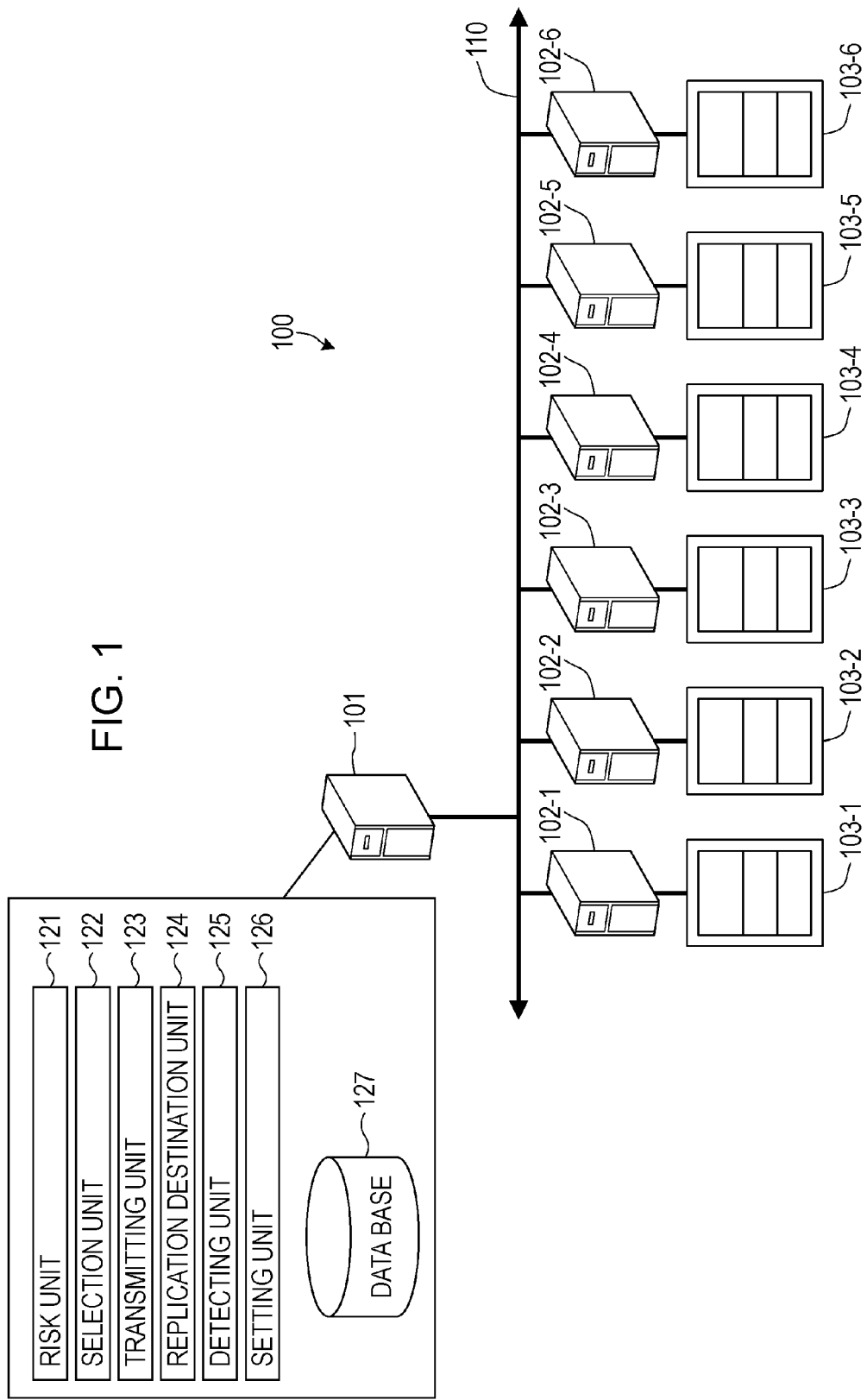
FIG. 1 is a diagram illustrating a system configuration of a memory system.

FIG. 1 is a diagram illustrating a system configuration of a memory system 100. In the memory system 100, a management node 101 is connected with a plurality (six nodes in the example illustrated in FIG. 1) of disk nodes 102-1 to 102-6 via networks 110 such as, for example, Internet, LAN (Local Area Network), WAN (Wide Area Network) and SAN (Storage Area Network) so as to communicate with one another.

The management node 101 is a computer for managing the operations of the disk nodes 102-1 to 102-6. The disk nodes 102-1 to 102-6 include RAID (Redundant Arrays of Inexpensive Disks) devices 103-1 to 103-6 and control data read out of the RAID devices 103-1 to 103-6 and data written into the RAID devices 103-1 to 103-6. Each of the RAID devices 103-1 to 103-6 is a device for generally managing a plurality of hard disks as one hard disk. Each of the RAID devices 103-1 to 103-6 is configured to save data in units of slices, for example.

In the explanation of this embodiment, a combination of each of the disk nodes 102-1 to 102-6 with each of the RAID devices 103-1 to 103-6 which are controlled using the corresponding disk nodes 102-1 to 102-6 will be referred to as memory. An ID (Identification) for uniquely identifying each of the disk nodes 102-1 to 102-6 is prepared for each of the disk nodes 102-1 to 102-6. In the explanation of this embodiment, the ID will be referred to as a disk node ID.

In order to make each branch numeral of the numeral assigned to each of the disk nodes 102-1 to 102-6 correspond to each numeral assigned to each disk node ID illustrated in FIG. 1, it is supposed that "001" denotes the disk node ID of the disk node 102-1, "002" denotes the disk node ID of the disk node 102-2, "003" denotes the disk node ID of the disk node 102-3, "004" denotes the disk node ID of the disk node 102-4, "005" denotes the disk node ID of the disk node 102-5 and "006" denotes the disk node ID of the disk node 102-6.

In the explanation of this embodiment, the management node 101 includes a risk unit 121 which determines a risk of failure of a plurality of memories, a selection unit 122 which selects a memory from among the plurality of memories, a transmitting unit 123 which transmits a replication instruction to another memory of the plurality of memories. The selected memory stores data to be replicated, and the replication instruction causes replication data corresponding to data stored in the selected memory to be replicated. The management node 101 may further include a replication destination unit 124 which determines the another memory from among the plurality of memories on the basis of the risk and/or an amount of free capacity of each memory. The management node 101 may further include a detecting unit 125 which detects a failed memory from among the plurality of memories, a setting unit 126 which, in the case that data stored in the failed memory detected by the detecting unit is master data, deletes the master data and sets replicated data corresponding to the master data as master data, and a database 127 includes a plurality of data tables.

Hardware Configuration of Nodes

Figure 2:
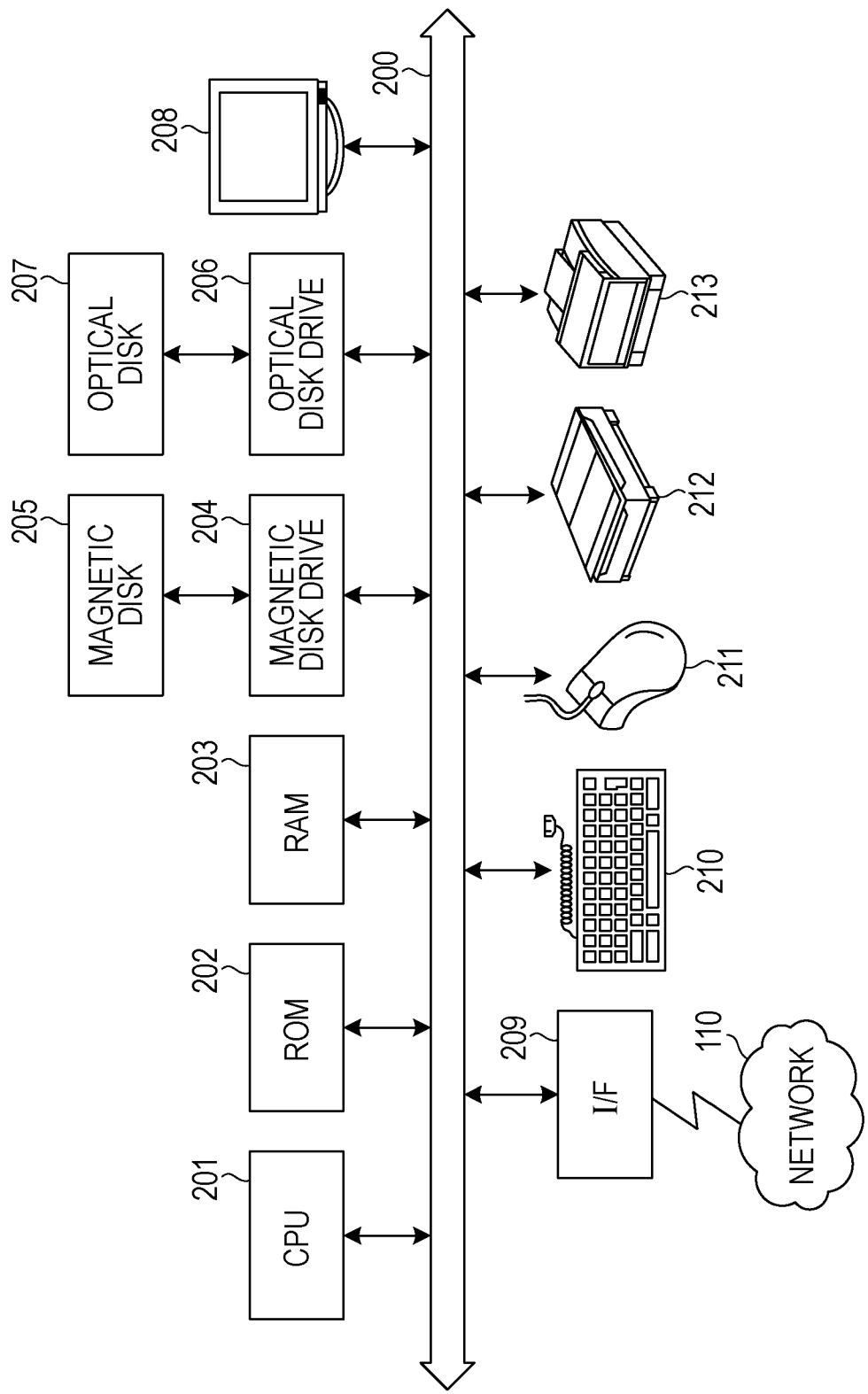
FIG. 2 is a block diagram illustrating a hardware configuration of a node according to an embodiment of the present invention.

FIG. 2 is a block diagram illustrating a hardware configuration of each of nodes (the management node 101 and the disk nodes 102-1 to 102-6) according to an embodiment of the present invention. In the example illustrated in FIG. 2, each node includes a CPU (Central Processing Unit) 201, a ROM (Read-Only Memory) 202, a RAM (Random Access Memory) 203, a magnetic disk drive 204, a magnetic disk 205, an optical disk drive 206, an optical disk 207, a display 208, an IF (Interface) 209, a keyboard 210, a mouse 211, a scanner 212 and a printer 213. The respective components are connected together via a bus 200.

In the example illustrated in the drawing, the CPU 201 operates to generally control the operations of the node concerned. The ROM 202 stores therein a program such as a boot program, for example. The RAM 203 is used as a work area of the CPU 201. The magnetic disk drive 204 controls data read out of the magnetic disk 205 and data written to the magnetic disk 205 under the control of the CPU 201. The magnetic disk 205 stores data which has been written thereto under the control of the magnetic disk drive 204.

The optical disk drive 206 controls data read out of the optical disk 207 and data written to the optical disk 207 under the control of the CPU 201. The optical disk 207 stores therein data which has been written thereto under the control of the optical disk drive 206 and makes a computer read data stored therein.

The display 208 displays, for example, a cursor, icons, tool boxes and data such as documents, images and functional information. As the display 208, for example, a CRT, a TFT liquid crystal display or a plasma display may be adopted.

The interface (hereinafter, referred to as the "I/F") 209 is connected to the network(s) 110 via a communication line and may be connected to other devices via the network(s) 110. The I/F 209 serves as an interface between the network(s) 110 and internal components so as to control data input into the node from external devices and data output from the node to the external devices. For example, a modem or a LAN adapter may be adopted as the I/F 209.

The keyboard 210 includes keys used to input characters, numerals and various instructions and data is input using these keys. A touch-panel type input pad or a ten-key pad may be used in place of the keyboard. The mouse 211 is used, for example, to move the cursor, to select a range, to move a window and to change the size of the window. A track ball or a joystick may be used in place of the mouse 211 on condition that it has similar functions as the mouse as a pointing device.

The scanner 212 is used to optically read an image and to fetch image data into the data management device. The scanner 212 may have a function acting as an OCR (Optical Character Reader). The printer 213 is used to print image data and document data. As the printer 213, for example, a laser printer or an ink jet printer may be adopted.

State upon Generation of Warning Message

Figure 3:
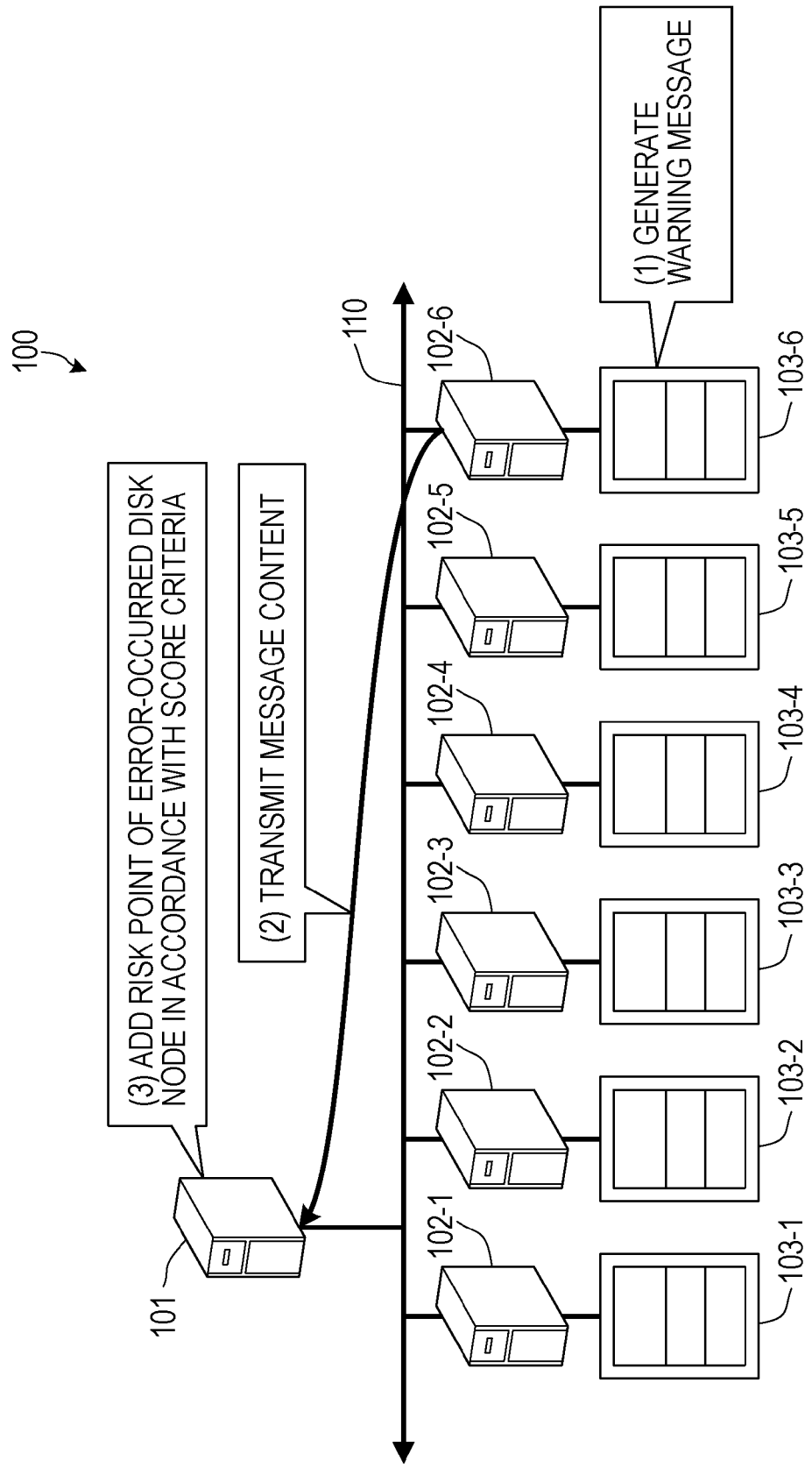
FIG. 3 is a diagram illustrating a system configuration of a memory system obtained upon generation of a warning message.

FIG. 3 is a diagram illustrating a system configuration of the memory system 100 when a warning message has been generated. (1) First, a warning message is generated due to occurrence of an error in any one of the disk nodes 102-1 to 102-6. In the example illustrated in FIG. 3, it is supposed that the error has occurred in the disk node 102-6 (or the RAID device 103-6).

(2) Then, the warning message is transmitted from the disk node 102-6 to the management node 101 via the network(s) 110. (3) In the management node 101, the content of the warning message is analyzed to calculate a risk point of the disk node 102-6. The risk point is an index value indicative of the likelihood that a node will fail. For example, the higher the index value, the more likely the node concerned will fail. Details of the calculation of the risk point will be described later.

FIG. 4 is a diagram illustrating a score table. A score table 400 is stored in a memory device in the management node 101, for example. The score table 400 is a table in which a warning object, an error name and a score are stored per warning objects in the record format. The warning object is indicative of a device in which an error, which is the origin of a warning message, has occurred. In the example illustrated in FIG. 4, the device is identified as a disk node or a RAID device. The error name is described in the corresponding warning message and specifies the content of the error that has occurred in the corresponding warning object. The score is a numerical value indicative of the degree of seriousness of the error, which has occurred. The higher the numerical value, the more serious the error is considered.

FIG. 5 is a diagram illustrating a warning log table. A warning log table 500 is stored in a memory device of the management node 101, for example. The warning log table 500 is a table in which a disk node ID, a date (an error occurred) and an error name are stored per warning message in the record format. The disk node ID of a disk node which is described in a warning message concerned and from which the warning message has been transmitted is written into the "Disk Node ID" column. Into the "Date" column, the error occurred date (a date under which the warning message has been received may be used instead) described in the warning message is written. Into "Error Name" column, the error name described in the warning message is written.

FIG. 6 is a diagram illustrating a risk point ranking table. The risk point ranking table 600 is stored in a memory device of the management node 101 and is a table in which an order, a disk node ID and a risk point are stored in the record format. The "Order" column in FIG. 6 indicates ranking of risk points in descending order. The "Disk Node ID" column specifies a disk node ranked in the order of a record concerned. The "Risk Point" column indicates the risk point of the record concerned.

Next, a method of calculating a risk point will be described. In calculation of the risk point, the CPU of the management node 101 illustrated in FIG. 2 reads out an error name which is of the same record as that of the disk node ID which will be an object of risk point calculation by referring to the warning log table 500 and then reads out a warning object and a score which are of the same record as that of the read-out error name by referring to the score table 400. The risk point of each disk node may be calculated using the following equation (1), for example.

$$\text{Risk point} = (\text{Sum of scores of disk nodes}) \times (\text{Sum of scores of RAID devices}) \quad (1)$$

Here, giving the warning log table 500 illustrated in FIG. 5 as an example, the risk point of the disk node 102-6 having the disk node ID: 006 will be $(1+2) \times (1+2) = 9$.

Risk Point Ranking Process

Figure 7:
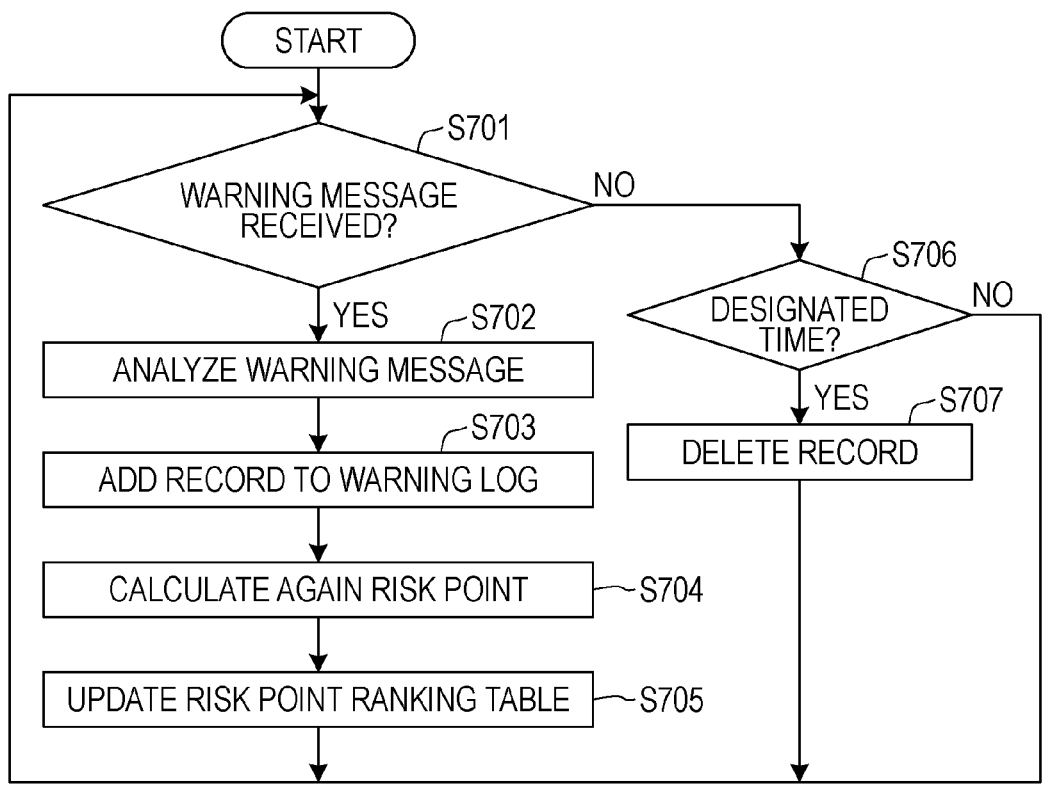
FIG. 7 is a flowchart illustrating a risk point ranking process executed using a management node.

FIG. 7 is a flowchart illustrating processing procedures of a risk point ranking process executed by the risk unit 121 of the management node 101. First, it is judged whether a warning message has been received from any one of the disk nodes 102-1 to 102-6 (step S701). When the warning message has been received (step S701: Yes), the warning message is analyzed (step S702). Specifically, the disk node ID, the date and the error name described in the warning message are extracted. Then, the extracted disk node ID, date and error name are added to the warning log table 500 as a new record (step S703).

Next, re-calculation of the risk points of all the disk nodes 102-1 to 102-6 is executed (step S704). In the re-calculation, the record added at step S703 is also considered. Then, the risk point ranking table 600 is updated (step S705) and the process returns to step S701. On the other hand, in the case that any warning message is not received (step S701: No), it is judged whether the designated time has come (step S706). In the case that the designated time does not come (step S706: No), the process returns to step S701.

On the other hand, when the designated time has come (step S706: Yes), the old record is deleted from the warning log table 500 (step S707) and the process returns to step S701. Incidentally, a term for which deletion is executed may be freely set by an operator of the management node 101. The risk point ranking process may be executed as occasion calls for in the above mentioned manner.

Triplication of Data

Next, triplication of data executed in the memory system 100 according to an embodiment of the present invention will be described. Master data and replicated data corresponding to the master data have already been distributive-stored in the RAID devices of respective memories in units of data. In this embodiment, typically, data is stored in a duplicated state. That is, master data and its replicated data of one piece of data are distributive-stored somewhere in the group of the RAID devices. However, in the case that a failure is likely to occur or the failure has occurred, data is triplicated. That is, the above mentioned master data and its replicated data, and then replicated data referred to herein as replicated spare data are distributive-stored somewhere in the group of the RAID devices. The replicated spare data will serve as a spare of the master data or the replication data.

Figure 8:
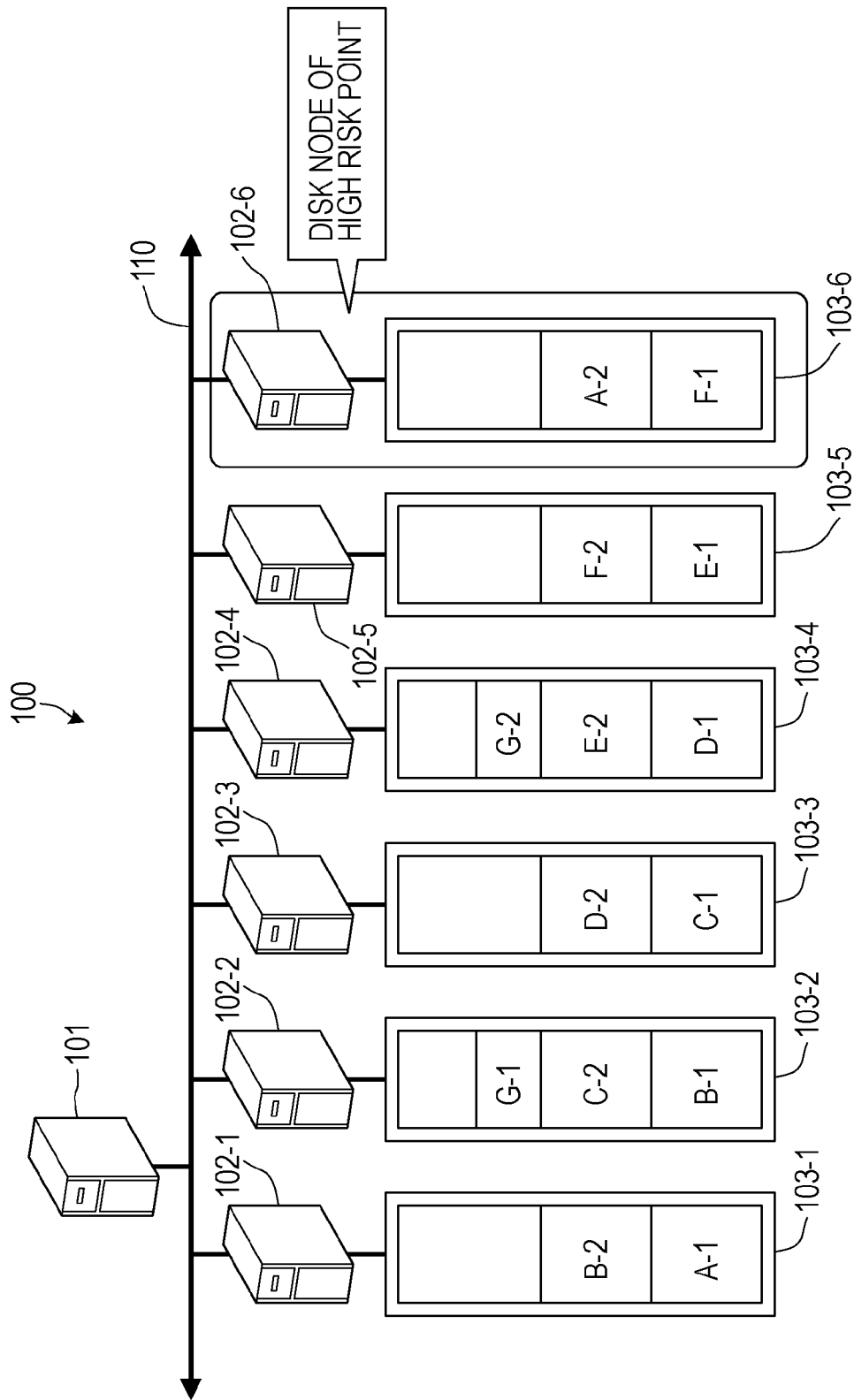
FIG. 8 is a diagram illustrating a state in which data is distributive-stored in a memory system according to an embodiment of the present invention.

FIG. 8 is a diagram illustrating an example of a data-distributive-stored state in the memory system 100 according to an embodiment of the present invention. In FIG. 8, a figure marked with "X-#" (X denotes an alphabet letter and # denotes a branch number) illustrates slice-based data stored in each RAID device. For example, data A-1 and data B-2 are stored in the RAID device 103-1. Incidentally, the data is stored in units of slices and hence "X" will also represent a slice name.

The branch number # of the data X-# represents a data replication class (master data, replicated data or replicated spare data). Specifically, # (=1) denotes each master data, # (=2) denotes each replicated data and # (=3) denotes each replicated spare data. For example, in the slice A, the data A-1 is the master data, data A-2 is the replicated data and data A-3 is the replicated spare data.

Figure 9:
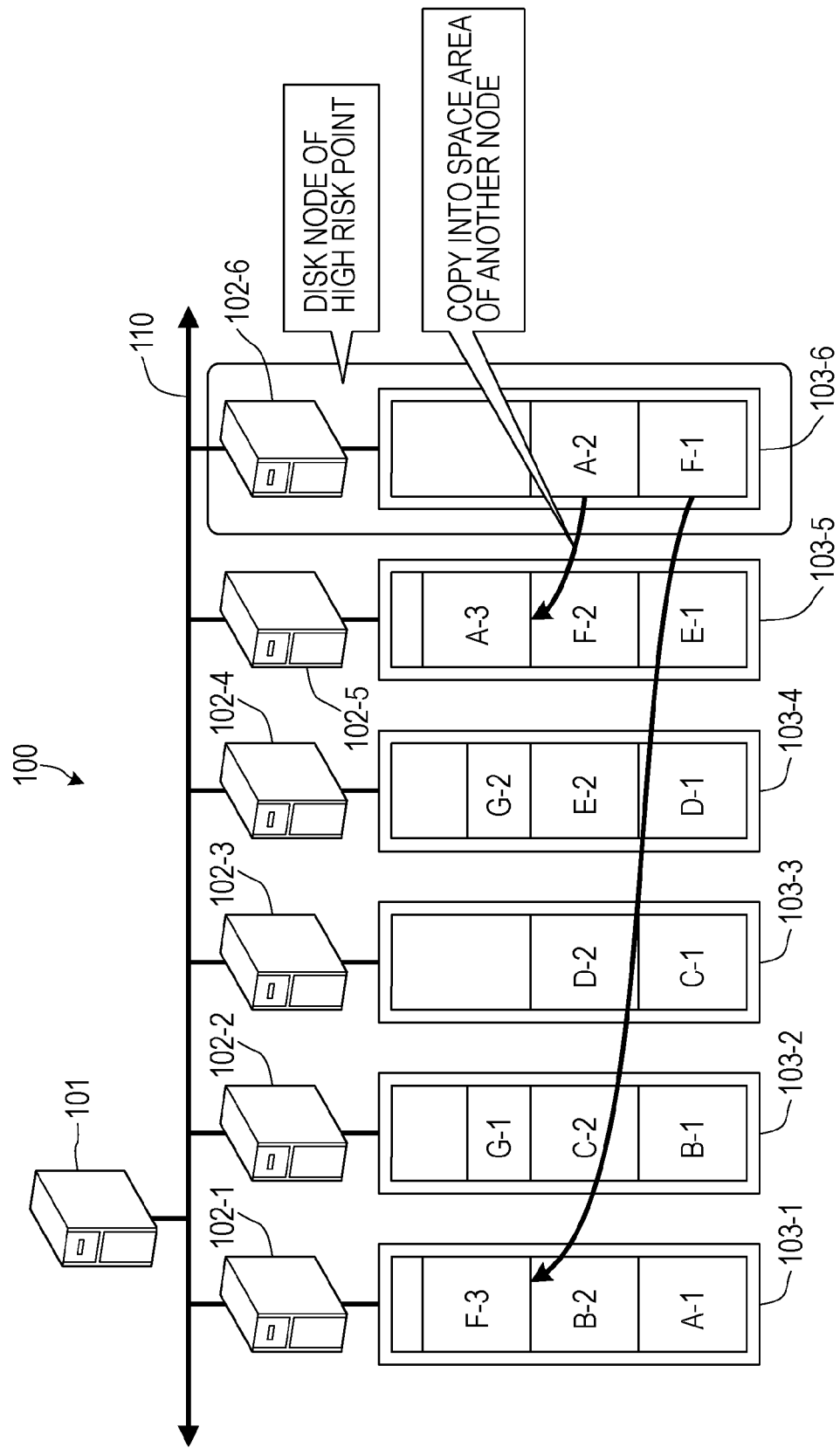
FIG. 9 is a diagram illustrating an example of triplication of data in a memory system according to an embodiment of the present invention.

FIG. 9 is a diagram illustrating one example of triplication of data executed in the memory system 100 according to an embodiment of the present invention. FIG. 9 illustrates an example in which data is triplicated from the distributive-stored state illustrated in FIG. 8. For example, if the risk point of the disk node 102-6 is the highest, the failure occurring probability of the RAID device 103-6 will be the highest. Thus, before the failure occurs, master data F-1 and the replicated data A-2 stored in the RAID device 103-6 are copied into free areas in the RAID devices of other disk nodes in a time zone for which the access load on the entire memory system 100 is low.

In the example illustrated in FIG. 9, replicated spare data F-3 which is a copy of the master data F-1 is stored in the RAID device 103-1. Likewise, the replicated spare data A-3 which is a copy of the replicated data A-2 is stored in the RAID device 103-5. The likelihood of data loss may be reduced or data loss may be prevented even when different memories have failed one after another by saving the replicated spare data, which will serve as the third data derived from the data stored in a high-risk-point memory, into free areas in the group of memories in the above mentioned manner. Incidentally, a RAID device which will serve as a replication destination of the replicated spare data is determined in accordance with the capacity of each free area (e.g., whether it is sufficient to save the data of the replication source) in each of the RAID devices 103-1 to 103-6, the risk point (the lower the better) of the disk node of the replication destination and the degree of distribution of the same data. (It is preferable that the master data, the replicated data and the replicated spare data be distributive-stored in RAID devices which are made different from one another to the greatest possible extent).

Data Overwriting

As the number of free areas in the entire group of memories is reduced, one piece of data is written over another piece of data in order starting from replicated spare data of a disk node which is lower in risk point than others. As a result, the largest possible amount of replicated spare data of disk nodes of higher risk points may be saved. Incidentally, free areas of the capacities corresponding to that of one disk node (for example, one RAID device) are normally retained as areas used for data redundancy restoration executed upon recovery.

Figure 10:
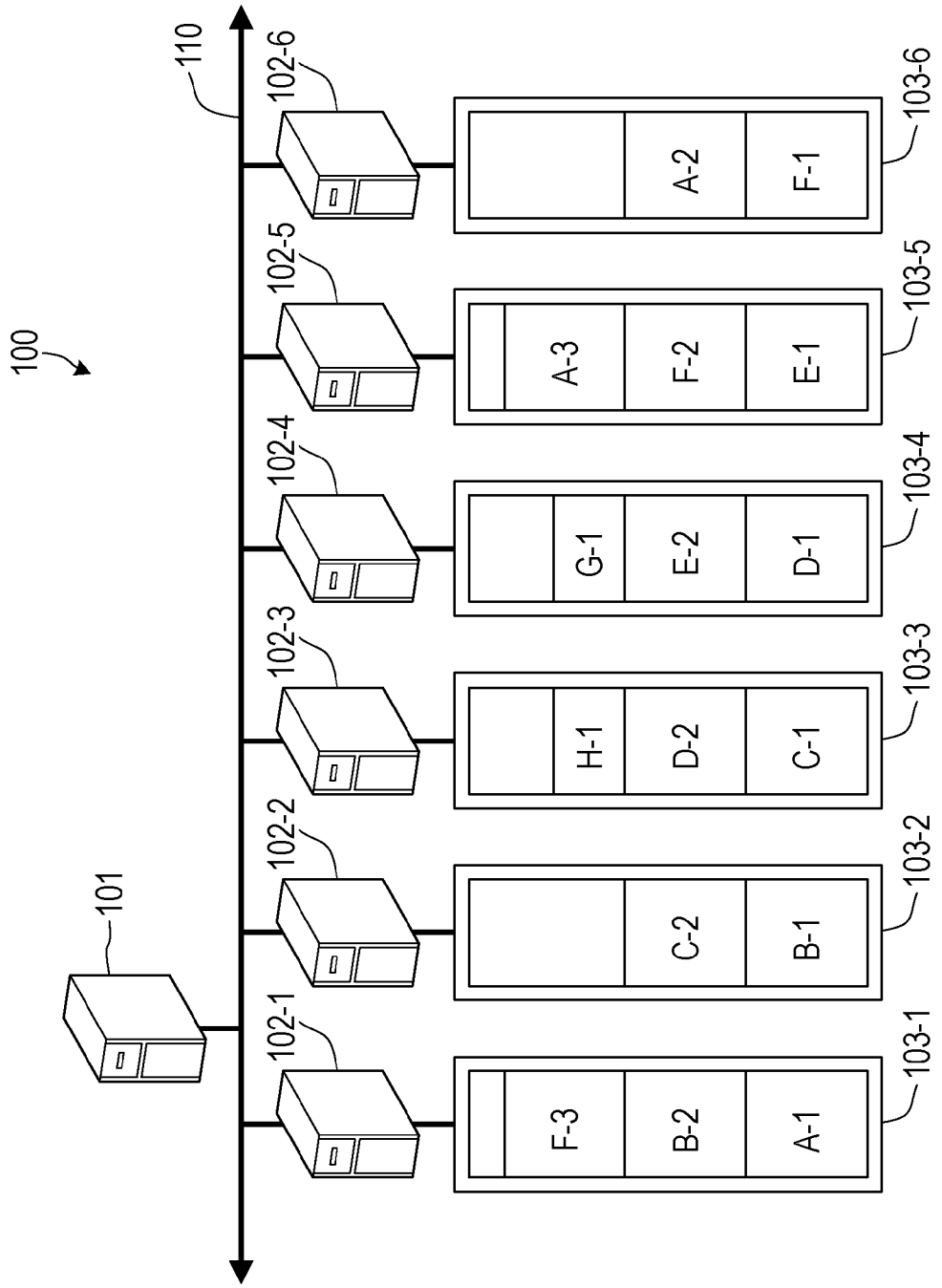
FIG. 10 is a diagram illustrating a state in which data is distributive-stored in a memory system before execution of data overwriting.

FIG. 10 is a diagram illustrating a state in which data is distributive-stored in the memory system 100 before execution of data overwriting. In the example illustrated in FIG. 10, the disk node 102-1 is supposed to be the disk node of the lowest risk point. The replicated spare data F-3 of the master data F-1 is stored in the RAID device 103-1 and is an object to be written over another data.

Figure 11:
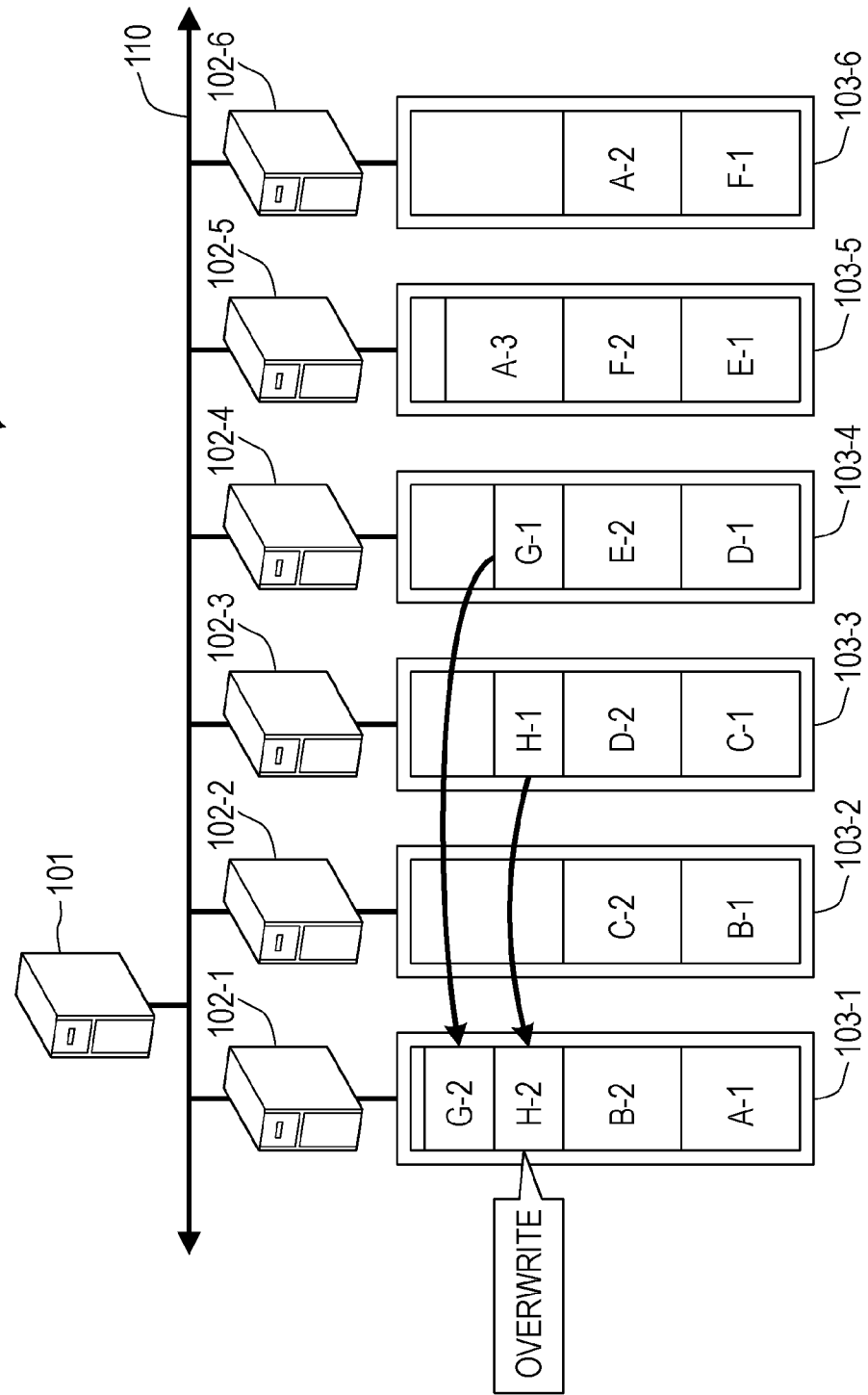
FIG. 11 is a diagram illustrating a state in which data is distributive-stored in a memory system after execution of data overwriting.

FIG. 11 is a diagram illustrating a state in which data is distributive-stored in the memory system 100 after execution of data overwriting. In the example illustrated in FIG. 11, master data H-1 stored in the RAID device 103-3 and master data G-1 stored in the RAID device 103-4 are written into the memory area of the replicated spare data F-3 (see FIG. 10) of the RAID device 103-1. As a result, replicated data H-2 and G-2 of the master data H-1 and G-1 are written over the replicated spare data F-3.

Data Rank-raising

Next, data rank-raising will be described. The data rank-raising is a process of raising data to higher order data. The data rank-raising refers to that in a certain slice X, its replicated space data X-3 is raised to its replicated data X-2 or its master data X-1 or its replicated data X-2 is raised to its master data X-1. The data rank-raising is executed in the case that a RAID device in which any one piece of triplicated data is stored or a disk node that controls the operation of the RAID device concerned has been down (e.g., inoperative) due to a failure, for example.

Figure 12:
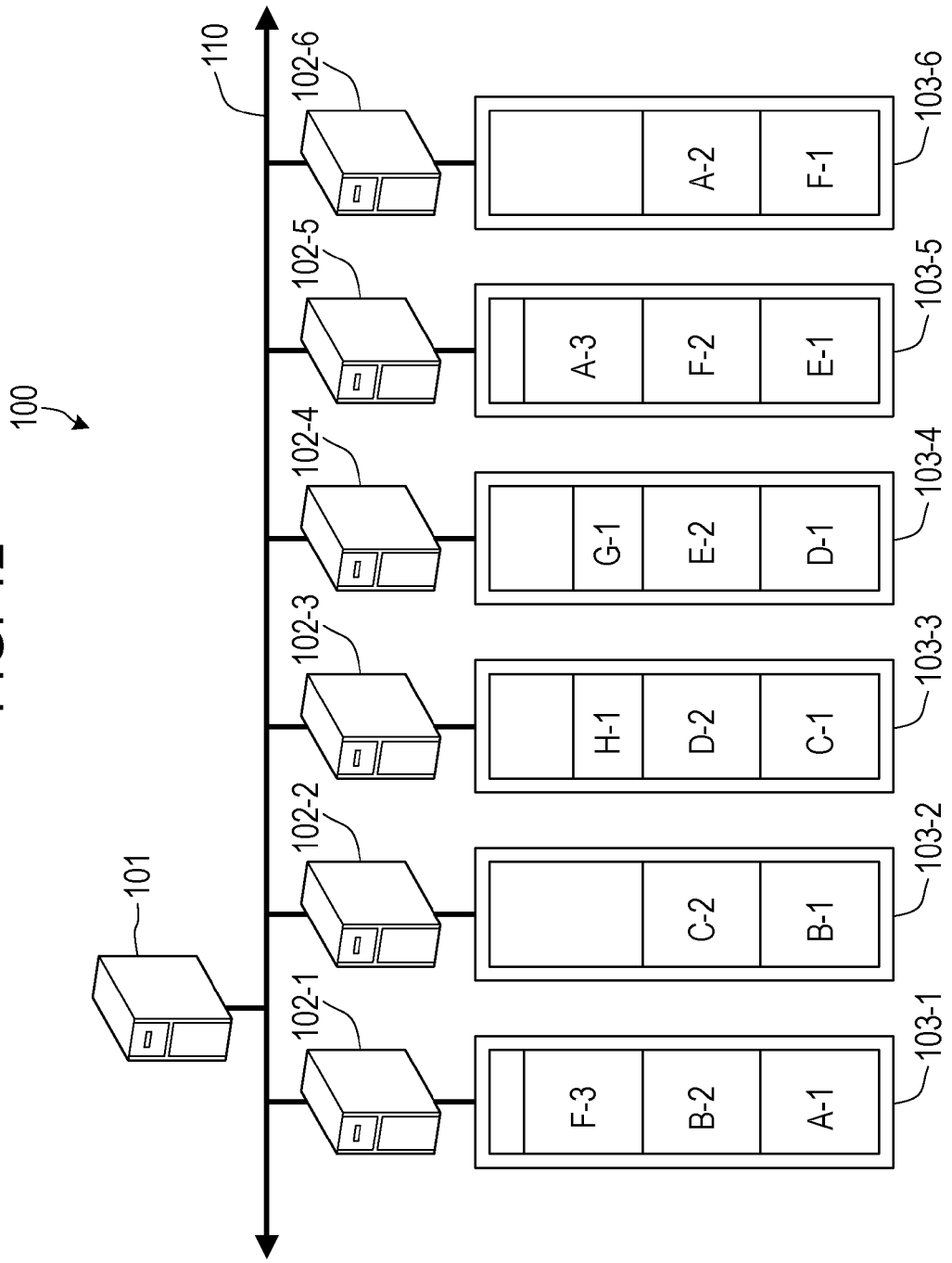
FIG. 12 is a diagram illustrating another example of triplication of data executed in a memory system according to an embodiment of the present invention.

FIG. 12 is a diagram illustrating another example of data triplication in the memory system 100 according to an embodiment of the present invention. In the example illustrated in FIG. 12, the data F-1 is triplicated as the master data F-1, the replicated data F-2 and the replicated spare data F-3. Likewise, the data A is triplicated as the master data A-1, the replicated data A-2 and the replicated spare data A-3. In the example illustrated in FIG. 12, it is supposed that the master data F-1 and the replicated data A-2 are stored in the RAID device 103-6 of the disk node 102-6.

Figure 13:
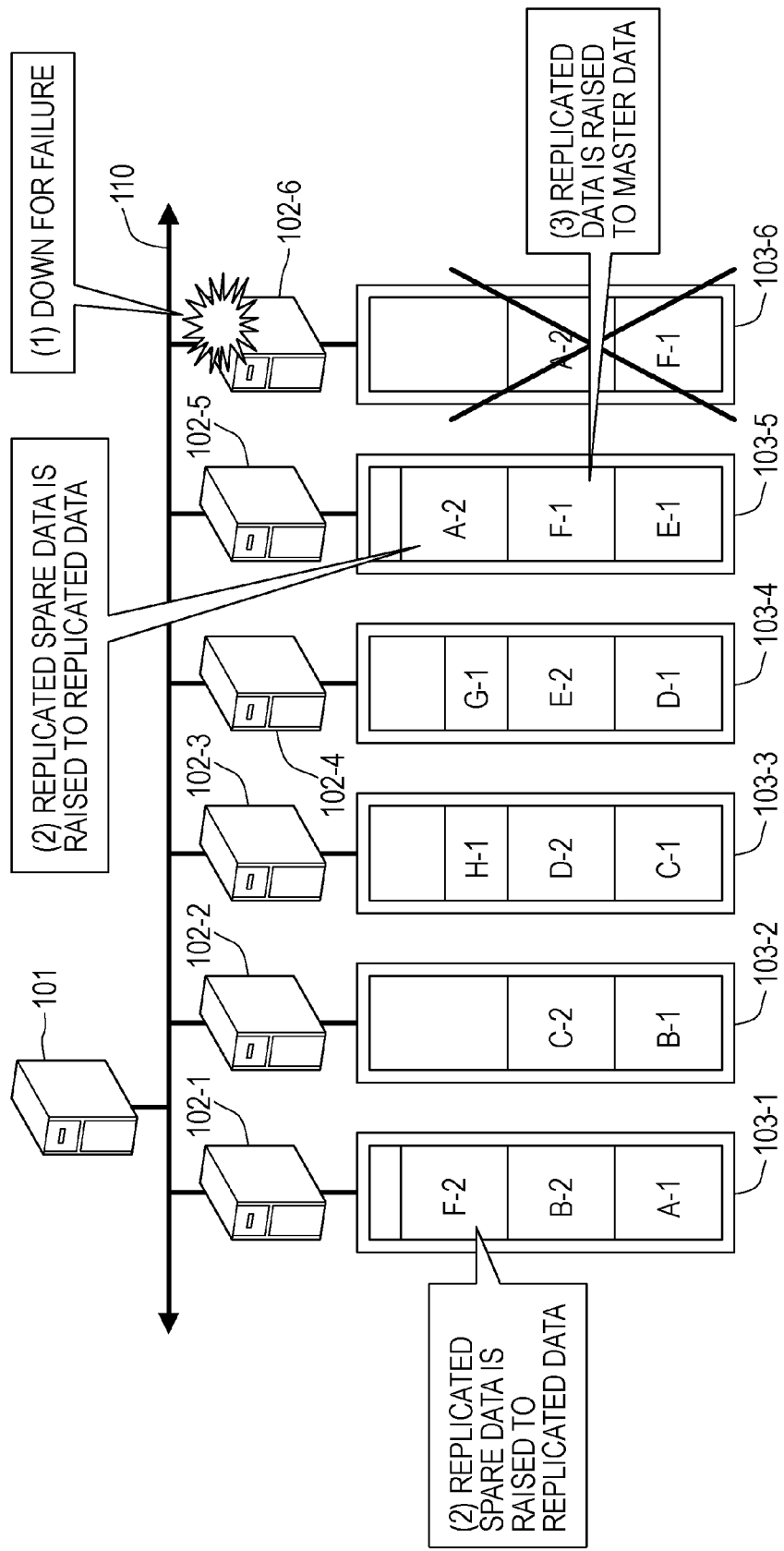
FIG. 13 is a diagram illustrating one example of rank-raising of data executed in a memory system according to an embodiment of the present invention.

FIG. 13 is a diagram illustrating one example of data rank-raising executed in the memory system 100 according to an embodiment of the present invention. FIG. 13 illustrates the example of data rank-raising from the state illustrated in FIG. 12. In the example illustrated in FIG. 13, it is supposed that the disk node 102-6 has been down for a failure. (1) First, when the disk node 102-6 has been down for the failure, (2) the RAID device 103-1 that stores the replicated spare data F-3 corresponding to the master data F-1 (see FIG. 12) stored in the RAID device 103-6 of the down disk node 102-6 is specified. The replicated spare data F-3 stored in the RAID device 103-1 is raised to the replicated data F-2. Likewise, the RAID device 103-5 that stores the replicated data F-2 corresponding to the master data F-1 (see FIG. 12) stored in the RAID device 103-6 of the down disk node 102-6 is specified. The replicated spare data F-2 stored in the RAID device 103-5 is raised to the master data F-1.

Then, the RAID device 103-5 that stores the replicated spare data A-3 corresponding to the replicated data A-2 (see FIG. 12) stored in the RAID device 103-6 of the down disk node 102-6 is specified. The replicated spare data A-3 stored in the RAID device 103-5 is raised to the replicated data A-2.

As described above, in the case that there exist sufficient free areas in the RAID devices 103-1 to 103-6 and all slices of data held in a failed disk node are triplicated, redundancy of data is not lost even immediately after the disk node has failed and hence data recovery may be instantly completed.

Figure 14:
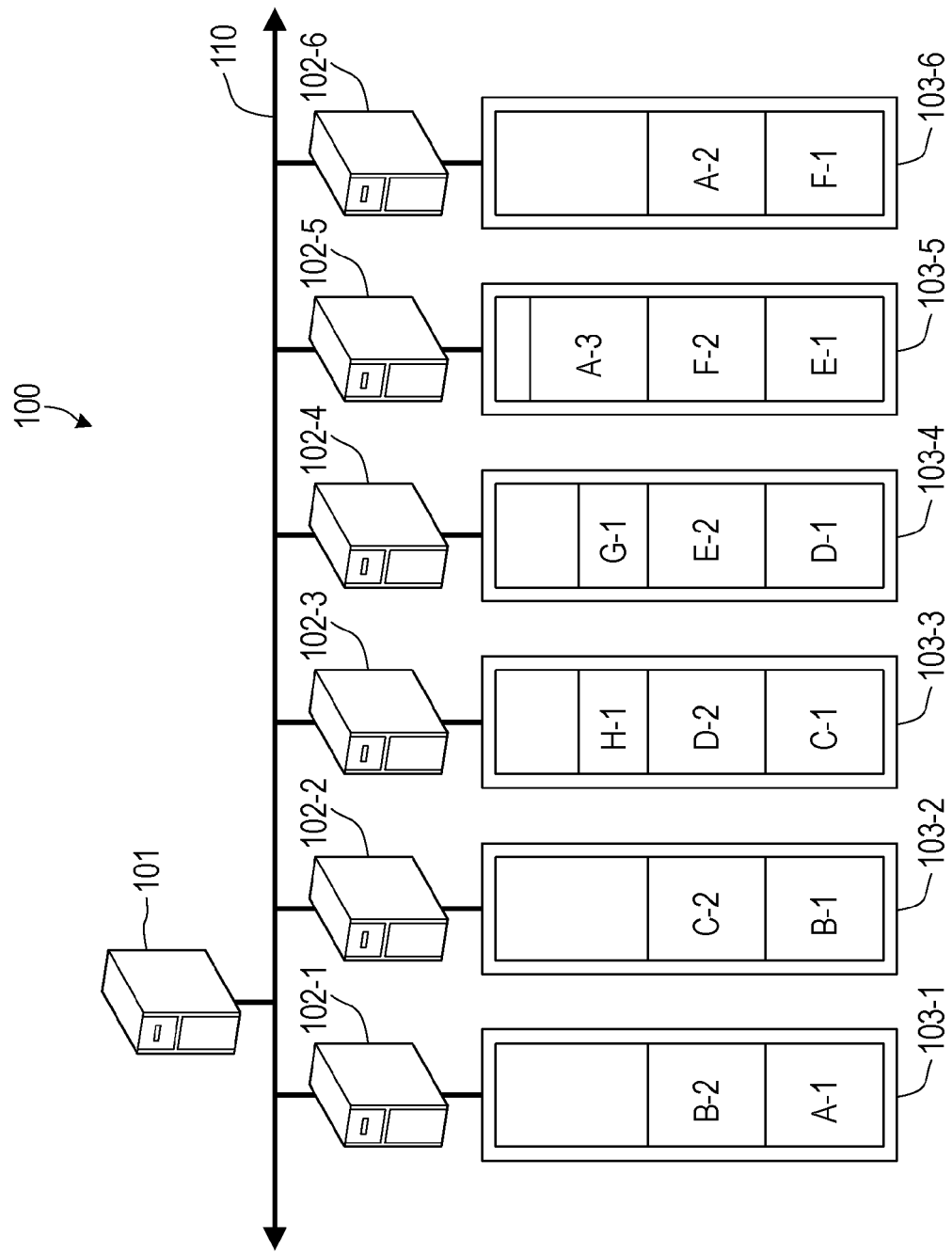
FIG. 14 is a diagram illustrating a further example of triplication of data executed in a memory system according to an embodiment of the present invention.

FIG. 14 is a diagram illustrating a further example of data triplication executed in the memory system 100 according to an embodiment of the present invention. In the example illustrated in FIG. 14, only the data A is triplicated as the master data A-1, the replicated data A-2 and the replicated spare data A-3. In addition, in the example illustrated in FIG. 14, it is supposed that the master data F-1 and the replicated data A-2 are stored in the RAID device 103-6 of the disk node 102-6.

Figure 15:
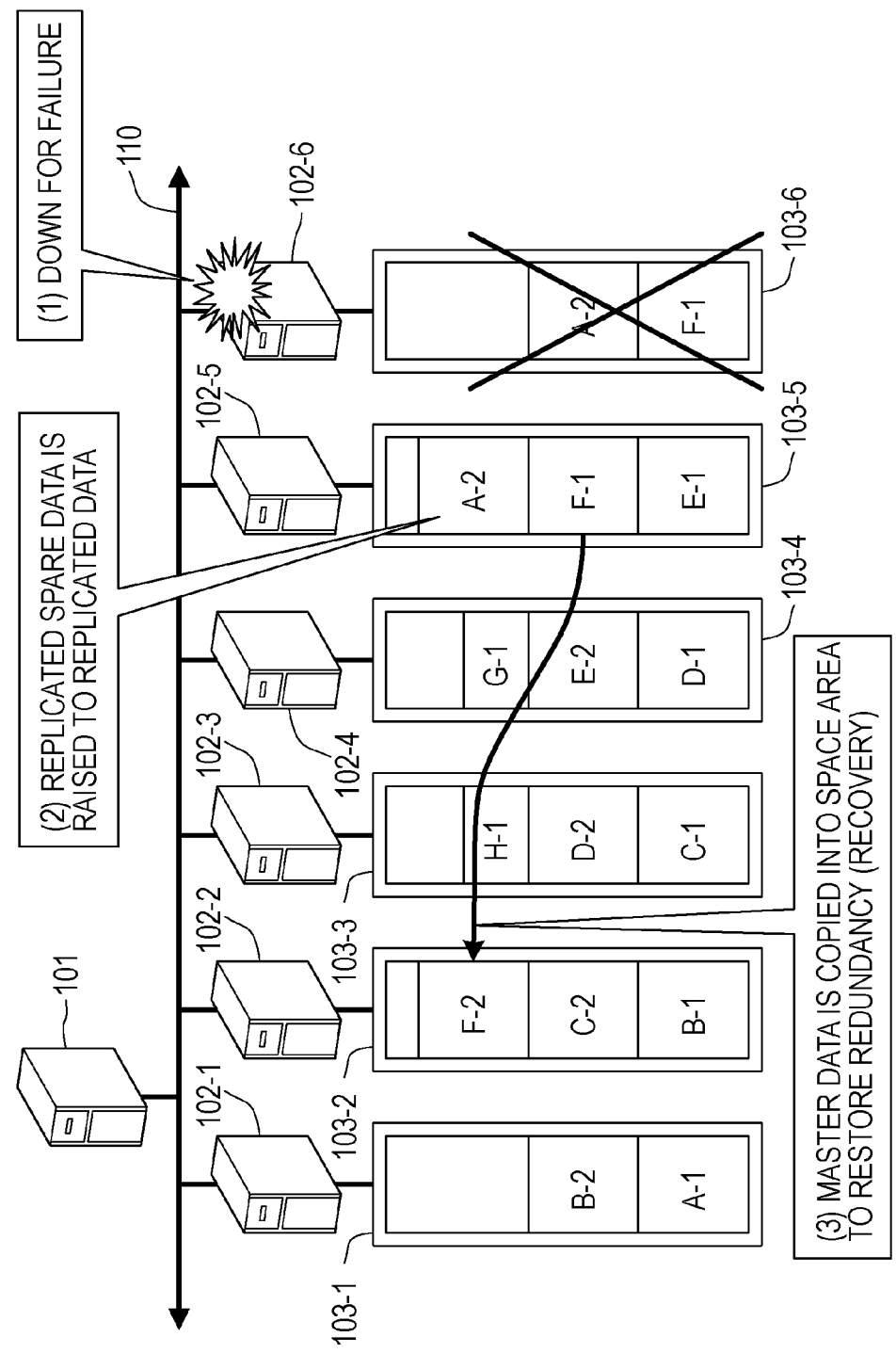
FIG. 15 is a diagram illustrating another example of rank-raising of data executed in a memory system according to an embodiment of the present invention.

FIG. 15 is a diagram illustrating another example of data rank-raising executed in the memory system 100 according to an embodiment of the present invention. FIG. 15 illustrates the example of data rank-raising from the state illustrated in FIG. 14. In the example illustrated in FIG. 15, it is supposed that the disk node 102-6 has been down for a failure. (1) First, when the disk node 102-6 has been down for the failure, (2) the RAID device 103-5 that stores the replicated data F-2 corresponding to the master data F-1 (see FIG. 14) stored in the RAID device 103-6 of the down disk node 102-6 is specified. The replicated data F-2 stored in the RAID device 103-5 is raised to the master data F-1. As a result, only the master data F-1 is retained as the data F and hence it is copied into a free area of any one (in this example, the RAID device 103-2) of the RAID devices 103-1 to 103-5 as the replicated data F-2.

Then, the RAID device 103-5 that stores the replicated spare data A-3 corresponding to the replicated data A-2 (see FIG. 12) stored in the RAID device 103-6 of the down disk node 102-6 is specified. The replicated spare data A-3 stored in the RAID device 103-5 is raised to the replicated data A-2.

As described above, in the case that there is no sufficient free area in the RAID devices and only a part of slices of data retained in the failed disk node has been triplicated, only a slice which is to be subjected to a redundancy restoring operation is recovered. Therefore, restoration may be completed in a short time.

Management Table and its Changes in State

Next, a management table and changes in states of the management table will be described. FIG. 16 is a diagram illustrating the management table. The management table 1600 is stored in the management node 101, for example. The management table 1600 is a table used for managing the group of disk nodes and "Disk Node ID", "Slice Name", "Data Class", "Disk Node ID of Disk Node Holding Data Paired with Slice" and "Disk Node ID of Disk Node Holding Replicated Spare Data" are listed as field items in the table. In the example illustrated in FIG. 16, for example, it is supposed that values of the respective field items correspond to those of the components illustrated in FIG. 14.

The data class corresponds to the branch number # of each data. "Disk Node ID of Disk Node Holding Data Paired with Slice" denotes the disk node ID of each disk node that holds the data which is the same as the master data in content and is different from the master data in class. For example, the record on the first line indicates that the master data A-1 is stored in the RAID device 103-1 of the disk node 102-1 having the disk node ID: 001.

A RAID device that holds the replicated data A-2 which is paired with the master data A-1 is the RAID device 103-6 having the disk node ID: 006 and a RAID device that holds the replicated spare data A-3 is the RAID device 103-5 having the disk node ID: 005. In addition, "000" is set for a disk node ID which is not present in the management table 1600.

FIG. 17 is a diagram illustrating the management table 1600 obtained after updated. The updated management table 1600 illustrated in FIG. 17 illustrates a state updated from the state illustrated in FIG. 16, that is, indicates that updating has been performed from the data distributive stored state illustrated in FIG. 14 to the data triplicated state illustrated in FIG. 15. Specifically, in the table, meshed parts of a record R1 are parts which have been changed in data triplication executed in order as illustrated in FIG. 14 and then in FIG. 15. Likewise, a record R2 is a record which has been freshly added by replication, meshed parts of records R3 and R4 are parts which have been changed by rank-raising and two-line-drawn records R5 and R6 are records which have been deleted due to failures.

FIG. 18 is a diagram illustrating an example of a slice table. The slice table is a table stored in a memory device of each disk node and indicates contents of data stored in an RAID device controlled using its corresponding disk node. Specifically, a slice name: X, a data class (#=branch numbers from 1 to 3) and address information indicative of the address range of each slice are stored in the record format in units of slices. It is supposed that slice tables (A) to (F) illustrated in FIG. 18 respectively correspond to the components illustrated in FIG. 14.

FIG. 19 illustrates an example of a slice table obtained after updated. The updated slice table illustrated in FIG. 19 is in a state updated from the state illustrated in FIG. 18, that is, updated from the data distributive- stored state illustrated in FIG. 14 to the data triplicated state illustrated in FIG. 15.

As illustrated in FIGS. 16 to 19, in the management table 1600 and the slice table, in the case that data has been replicated, a record is added and updated, in the case that the data has been raised to a higher rank, the data class of the corresponding record is updated and in the case that a failure has been detected, the record of the failed disk node is deleted by the setting unit 126 of the management node 101.

Sequence of Data Managing Process

Figure 20:
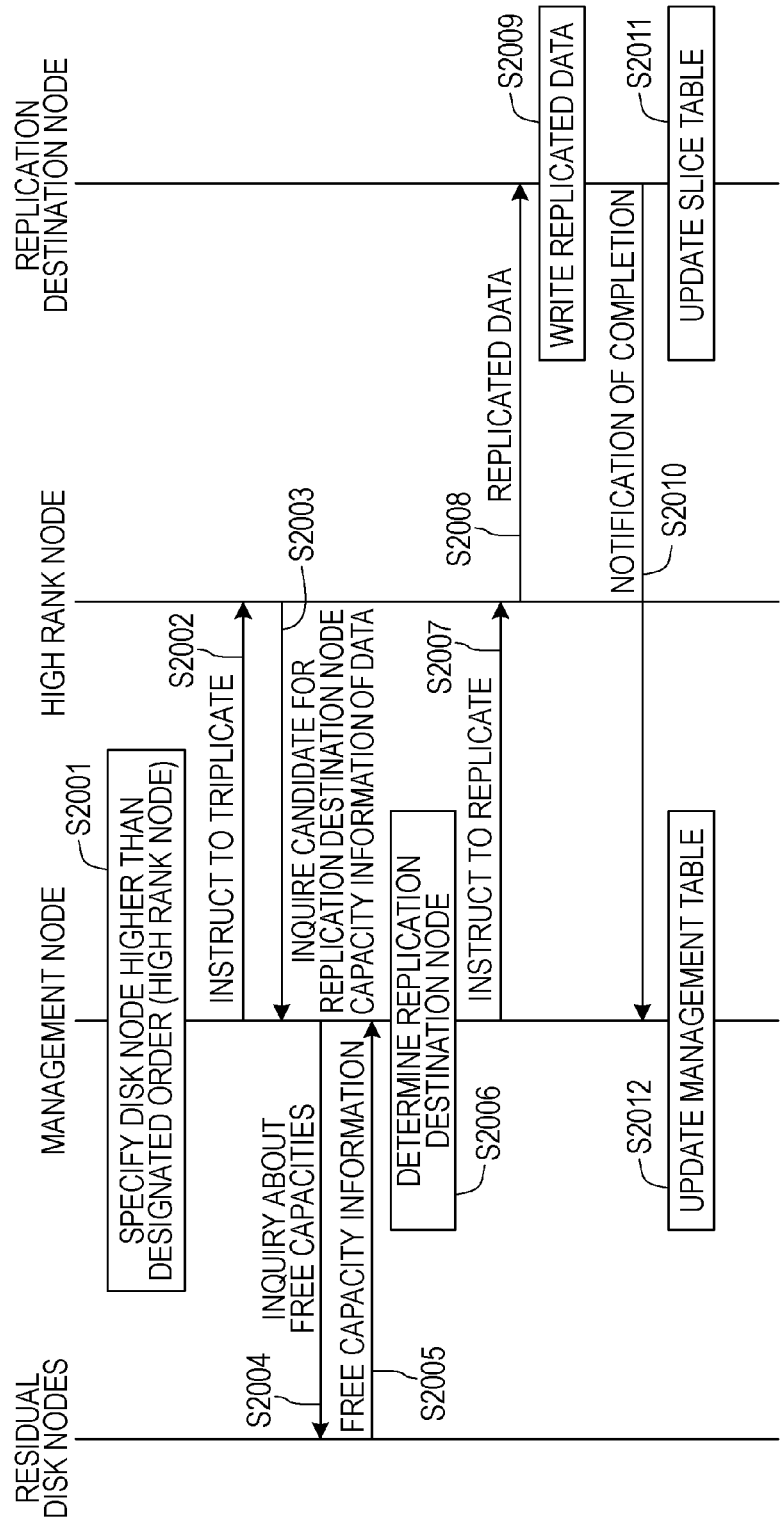
FIG. 20 is a sequence diagram of a data triplication process according to an embodiment of the present invention.

FIG. 20 illustrates a sequence of a data triplication process according to an embodiment of the present invention. First, the replication source determining unit 122 of the management node 101 specifies a disk node (hereinafter, referred to as a high-rank node) of a rank higher than a designated order, by referring to the risk point ranking table 600 (step S2001). In the example illustrated in FIG. 20, the designated order is an order that an operator has freely set. Next, the transmitting unit 123 of the management node 101 transmits a triplication instruction to the high-rank node via the network(s) (step S2002). The high-rank node which has received the triplication instruction transmits an inquiry about the candidate for replication destination node and capacity (size) information of data to be triplicated as a reply to the management node 101 (step S2003).

The management node 101 which has received the inquiry about the candidate for replication destination node transmits an inquiry about free capacities to disk nodes other than the high-rank node (step S2004). Each disk node which has received the inquiry about the free capacities transmits information on its free capacity to the management node 101 as a reply (step S2005). The replication destination determining unit 124 of the management node 101 compares the free capacities in the information transmitted from the disk nodes other than the high-rank node with one another to determine the replication destination node (step S2006)

The replication destination node is determined depending on whether it has a free capacity corresponding to the capacity (size) of data to be triplicated as a precondition. In the case that there exist a plurality of candidates for replication destination node having the free capacities meeting the precondition, a node into which the same data as the data to be triplicated is not stored is preferentially adopted. As a result, data may be stored in the distributed state within the group of memories. As an alternative, a high-risk-point node may be preferentially adopted. Whether the former node or the latter node is preferentially adopted may be determined upon initial setting.

When the replication destination node is determined in the above mentioned manner (step S2006), the management node 101 transmits a replication instruction including the disk node ID of the replication destination node to the high-rank node (step S2007). The high-rank node which has received the replication instruction transmits replicated data of the data to be triplicated to the replication destination node (step S2008). The replication destination node receives the transmitted replicated data and writes it into its free area (step S2009). That is, the replicated data to be triplicated is stored as replicated spare data.

Then, the replication destination node transmits a notification that data writing has been completed (hereinafter, referred to as a notification of completion) to the management node 101 (step S2010) and the slice table is updated (step S2011). Specifically, a new record is added for the replicated spare data. In addition, the management node 101 which has received the notification of completion updates the management table 1600 (step S2012). Specifically, the new record is added for the replicated spare data and the record is updated with respect to the field item of the node holding data paired with the slice. By executing the data managing process in the above mentioned sequence, data triplication may be automatically executed. Variations may be considered regarding when to execute each of the above-described processing. All of the processing (from calculating a risk point to transmitting a replication instruction) may be executed whenever a warning message is received, for example. Alternatively, processing up to updating the ranking table is performed when a warning message is received, and a replication instruction is transmitted if a risk point of one of disk nodes exceeds a threshold value, for example.

Figure 21:
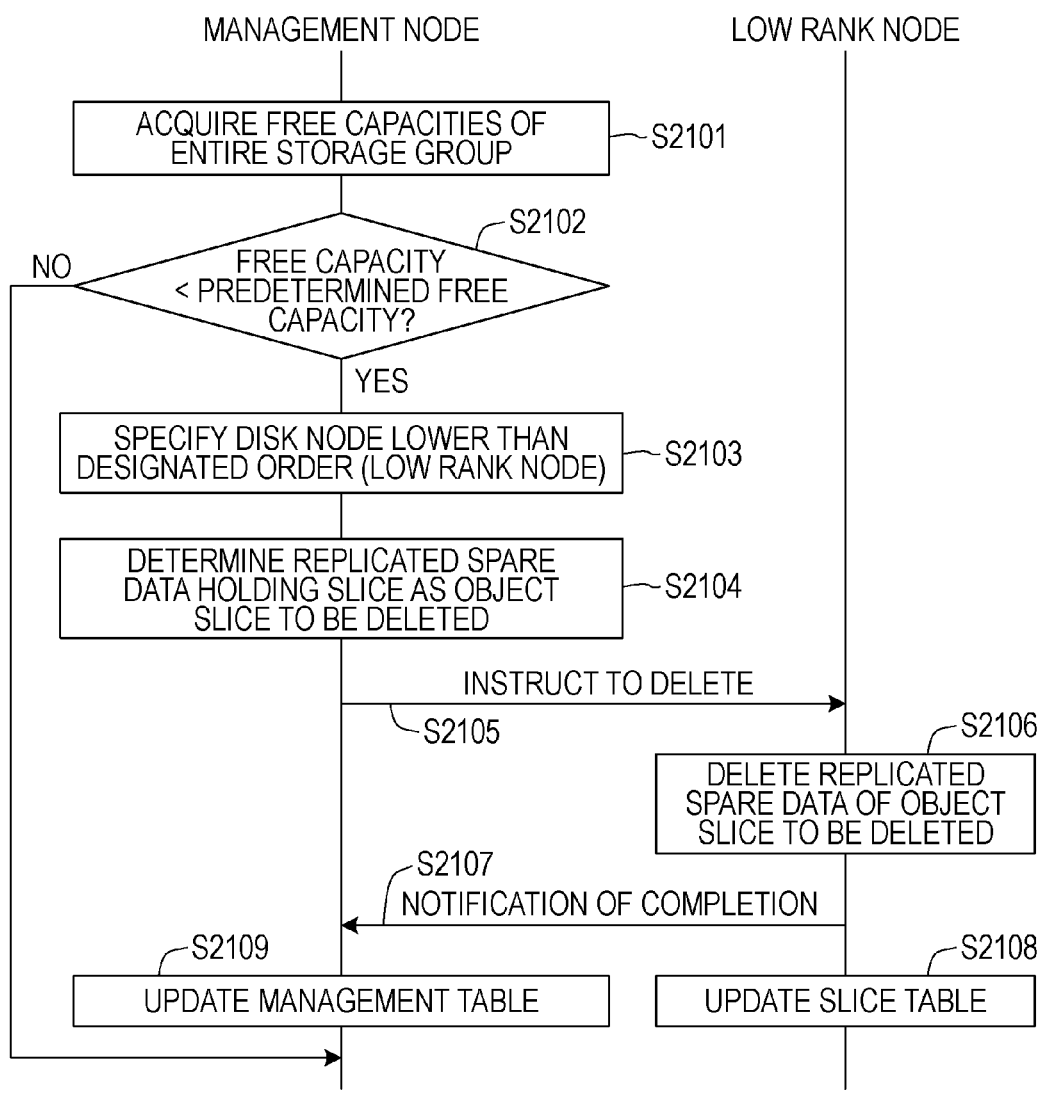
FIG. 21 is a sequence diagram of a replicated spare data deleting process.

FIG. 21 is a diagram illustrating a sequence of a replicated spare data deleting process. This sequence is of a process of writing another piece of data into a free area from which the previously stored data has been deleted and corresponds to the sequence of the above mentioned overwriting process. First, the management node 101 acquires information on free capacities of the entire memory group (e.g., the RAID device group) (step S2101). A free capacity acquiring process is executed in the following manner. That is, the management node 101 inquires of each disk node about its free capacity and receives information on the free capacity in each RAID device from each disk node in accordance with a response therefrom.

Then, whether the acquired free capacity is smaller than a specified free capacity is judged (step S2102). The specified free capacity may be set on the side of the operator. For example, a disk capacity corresponding to that of one RAID device may be set as the specified free capacity. When there exists a free capacity larger than the disk capacity corresponding to that of one RAID device, even if one memory fails, it may be possible to restore all the data stored in the failed memory into the free capacity. In the case that the acquired free capacity is not smaller than the specified free capacity (step S2102: No), enough capacity is retained and hence the process executed using the management node 101 is terminated.

On the other hand, in the case that the acquired free capacity is smaller than the specified free capacity (step S2102: Yes), a disk node of a rank lower than the designated order (hereinafter, referred to as a low-rank node) is specified by referring to the risk point ranking table 600 (step S2103). Then, a replicated spare data holding slice in a RAID device controlled using the specified low-rank node is determined as a slice to be data-deleted (step S2104). Then, the management node 101 transmits an instruction to delete the replicated spare data to the low-rank node (step S2105).

The low-rank node which has received the data deleting instruction deletes the replicated spare data held in the slice to be data-deleted (step S2106). Then, the low-rank node transmits a notification that data deletion has been completed (hereinafter, referred to as a notification of completion) to the management node 101 (step S2107) and updates the slice table (step S2108). The management node 101 which has received the notification of completion updates the management table 1600 (step S2109). Then, the management node 101 transmits an instruction to write data into the low-rank node to another disk node. As a result, the disk node which has received the data writing instruction is allowed to replicate the data into the free area in the low-rank node.

FIG. 22 is a diagram illustrating a sequence of a data rank-raising process. First, the management node 101 transmits a request to confirm whether it is alive (hereinafter, referred to as an aliveness confirmation request) to all the disk nodes (step S2201). Each disk node which has received the aliveness confirmation request transmits a response to aliveness confirmation to the management node 101 (step S2202). The detecting unit 125 of the management node 101 detects a disk node from which the response to aliveness confirmation is not received to be a failed node and specifies the data stored in the RAID device of the failed node as lost data (step S2203).

Then, the setting unit 126 of the management node 101 specifies the data of the same class as the lost data as data to be rank-raised by referring to the management table 1600 (step S2204). Specifically, in the case that there exists replicated spare data of the lost data in another RAID device which does not fail, the replicated spare data is specified as data to be rank-raised, while in the case that there exists no replicated spare data and there exists replicated data, the replicated data is specified as the data to be rank-raised. That is, data having the largest branch number # is specified as the data to be rank-raised. In the example illustrated in FIG. 14, the replicated data F-2 and the replicated spare data A-3 stored in the RAID device 103-5 are specified as data to be rank-raised.

In addition, in the case that there exists data retained only in the form of master data as a result of execution of rank-raising, the replication destination unit 124 of the management node 101 specifies a replication destination node having surplus free capacities by referring to the free capacities of nodes other than the failed node (step S2205). In the case that there exist plural candidates for the replication destination node, a disk node of a higher risk point may be preferentially adopted as mentioned above.

Then, the setting unit 126 of the management node 101 transmits a rank-raising instruction to a disk node that holds data to be rank-raised (step S2206). The disk node which has received the rank-raising instruction raises the rank of the data to be rank-raised by updating the slice table (step S2207). Specifically, setting of each number indicative of each data class in the slice table is changed. For example, in the case that the data to be rank-raised is replicated spare data, the number of the data class is changed from "3" to "2", while in the case that it is replicated data, the number of the data class is changed from "2" to "1".

Then, the disk node which has completed execution of the rank-raising process transmits a notification that the rank-raising process has been completed (hereinafter, referred to as a notification of completion) to the management node 101 (step S2208). In the case that the replication destination node is specified at step S2205, the management node 101 transmits an instruction to replicate the rank-raised data (hereinafter, referred to as a replication instruction) to the disk node which has completed execution of the rank-raising process (step S2209).

The disk node which has completed execution of the rank-raising process receives the replication instruction and transmits the replicated data of the rank-raised data to the replication destination node (step S2210). The replication destination node which has received the replicated data writes the received replicated data into its free area (Step S2211). Owing to the above mentioned operation, the rank-raised master data may be replicated upon rank-raising. Then, the replication destination node updates its slice table (step S2212) and transmits a notification of completion to the management node 101 (step S2213). Then, the management node 101 updates the management table 1600 with respect to the rank-raising process (step S2207) and the data replicating process (step S2211) (step S2214).

As described above, the management node 101 and the disk nodes implement the processes (functions expressed using arrows and blocks) illustrated in FIGS. 20 to 22 by making the CPU execute the programs stored in the components illustrated in FIG. 2 or by using the I/F 209.

As a result of execution of the above mentioned processes, in the above mentioned embodiments, the risk of failure of each disk node is recorded as a risk point and replicated spare data is prepared in order starting from data retained in a higher risk point disk node. Owing to the above mentioned operation, the time taken for redundancy restoration executed upon occurrence of the recovering operation is expected to be reduced. In the case that free areas in the entire memory group are used up, the replicated spare data is written over another data. Owing to the above mentioned operation, the largest possible amount of replicated spare data of the high-risk-point disk node may be retained.

Therefore, the time required for execution of the recovering operation may be reduced by triplicating preferentially data which is higher in future redundancy loss probability. As a result, the risk of data loss induced by the occurrence of double fault may be reduced. In addition, the device according to the embodiments of the present invention is of the system to triplicate data utilizing free areas and hence it may be implemented with plant and equipment investment equal to that of the existing system. As described above, data may be maximally approximated to a triplicated state by utilizing the metabolizing function of memories.

The data managing method which has been described in the embodiments of the present invention may be implemented by executing a program which has been prepared in advance using a computer such as a personal computer or a workstation. The program is executed by being recorded in a computer-readable recording medium such as a hard disk, a flexible disk, a CD-ROM, an MO or a DVD and then read out of the recording medium using a computer. The program may be distributed to external devices via a network such as Internet.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data management device to access a plurality of memories, the data management device comprising:
   a receiver to receive warning messages from the plurality of memories;
   a risk unit to determine a risk of failure associated with each memory of the plurality of memories on the basis of the received warning messages;
   a selection unit to select a first memory from the plurality of memories based on the determined risk of failure associated with each memory of the plurality of memories;
   a replication destination unit to determine an entire amount of free capacity of each of the plurality of memories is smaller than a specified amount of free capacity, and a risk associated with each of the plurality of memories; and
   a transmitting unit to transmit
      a delete instruction to a second memory of the plurality of memories to delete data corresponding to a replicated spare data, the replicated spare data is a second copy of a master data, the master data or a first copy of the master data is saved in another memory of the plurality of memories respectively;
      a replication instruction to the first memory to store in the second memory.

2. The data management device according to claim 1, wherein the risk associated with each of the plurality of memories is used to maintain a list ranking the plurality of memories, and the risk unit selects a highest ranked memory as the first memory, the highest ranked memory corresponding to the memory most likely to fail.

3. The data management device according to claim 1, wherein the transmitting unit transmits the replication instruction when the risk of failure of the first memory is higher than a threshold value.

4. The data management device according to claim 1, wherein the second memory is ranked lower than a designated order.

5. The data management device according to claim 1, further comprising:
   a detecting unit to detect a failed memory from among the plurality of memories, the plurality of memories including master data and replicated data corresponding to a first copy of the master data; and
   a setting unit to set, in a case that data stored in the failed memory detected by the detecting unit is master data, the replicated data as the master data.

6. The data management device according to claim 5, wherein the plurality of memories further include replicated spare data corresponding to a second copy of the master data, and the setting unit, in a case that data stored in the failed memory detected by the detecting unit is master data, sets the replicated spare data as replicated data.

7. The data management device according to claim 5, wherein the setting unit causes the transmitting unit to transmit a replication instruction to make a memory, other than a memory that stores the data which has been set as the master data, replicate the data which has been set as the master data and store the replicated data.

8. A data managing method executed using a data management device accessible to a plurality of memories, the method comprising:
   receiving warning messages from the plurality of memories;
   determining a risk of failure associated with each memory of the plurality of memories on the basis of the received warning messages;
   selecting a first memory from among the plurality of memories on the basis of the determined risk of failure associated with each memory of the plurality of memories;
   determining an entire amount of free capacity of each of the plurality of memories is smaller than a specified amount of free capacity, and a risk associated with each of the plurality of memories;
   transmitting a delete instruction to a second memory of the plurality of memories to delete data corresponding to a replicated spare data, the replicated spare data is a second copy of a master data, the master data or a first copy of the master data is saved in another memory of the plurality of memories respectively;
   transmitting a replication instruction to the first memory to store in the second memory.

9. The method according to claim 8, wherein the risk associated with each of the plurality of memories is used to maintain a list ranking the plurality of memories, and wherein the determining determines a highest ranked memory as the first memory, the highest ranked memory corresponding to the memory most likely to fail.

10. The method according to claim 8, wherein the transmitting the replication instruction is executed when the risk of failure of the first memory is higher than a threshold value.

11. The method according to claim 8, wherein the second memory is ranked lower than a designated order.

12. A computer readable storage medium storing a data management program to be executed, by a data management device accessible to a plurality of memories, execution of the program causing the data management device to perform a process comprising:

receiving warning messages from the plurality of memories;

determining a risk of failure associated with each memory of the plurality of memories on the basis of the received warning messages;

selecting a first memory from among the plurality of memories on the basis of the determined risk of failure associated with each memory of the plurality of memories;

determining an entire amount of free capacity of each of the plurality of memories is smaller than a specified amount of free capacity, and a risk associated with each of the plurality of memories;

transmitting a delete instruction to a second memory of the plurality of memories to delete data corresponding to a replicated spare data, the replicated spare data is a second copy of a master data, the master data or a first copy of the master data is saved in another memory of the plurality of memories respectively;

transmitting a replication instruction to the first memory to store in the second memory.

13. The storage medium according to claim 12, wherein the risk associated with each of the plurality of memories is used to maintain a list ranking the plurality of memories, and wherein the determining determines a highest ranked memory as the first memory, the highest ranked memory corresponding to the memory most likely to fail.

14. The storage medium according to claim 12, wherein the transmitting the replication instruction is executed when the risk of failure of the first memory is higher than a threshold value.

15. The storage medium according to claim 12, wherein the second memory is ranked lower than a designated order.

* * * * *